United States Patent
Heimbecher

(10) Patent No.: US 8,331,551 B2
(45) Date of Patent: Dec. 11, 2012

(54) SYSTEM AND METHOD FOR IDENTIFYING A CALLER USING ASSOCIATED SOUNDS

(75) Inventor: Reed Heimbecher, Golden, CO (US)

(73) Assignee: Heimbecher Enterprises, LLC, Hamel, MN (US)

( * ) Notice: Subject to any disclaimer, the term of this patent is extended or adjusted under 35 U.S.C. 154(b) by 329 days.

(21) Appl. No.: 12/211,496

(22) Filed: Sep. 16, 2008

(65) Prior Publication Data

US 2009/0010402 A1 Jan. 8, 2009

Related U.S. Application Data

(62) Division of application No. 10/541,264, filed as application No. PCT/US03/41934 on Dec. 31, 2003, now Pat. No. 7,426,269.

(60) Provisional application No. 60/437,404, filed on Dec. 31, 2002.

(51) Int. Cl.
*H04M 1/00* (2006.01)

(52) U.S. Cl. .......... 379/374.02; 379/76; 379/142.06; 379/374.01; 379/373.04

(58) Field of Classification Search ...... 379/372–376.02
See application file for complete search history.

(56) References Cited

U.S. PATENT DOCUMENTS

| | | |
|---|---|---|
| 3,686,440 A | 8/1972 | Kroeger |
| 3,727,003 A | 4/1973 | Paraskevakos |
| 3,787,626 A | 1/1974 | Subieta |
| 4,242,539 A | 12/1980 | Hashimoto |
| 4,266,098 A | 5/1981 | Novak |
| 4,289,931 A | 9/1981 | Baker |
| 4,672,660 A | 6/1987 | Curtin |
| 4,811,382 A | 3/1989 | Sleevi |
| 5,394,445 A | 2/1995 | Ball |
| 5,673,299 A | 9/1997 | Fuller et al. |
| 5,796,806 A | 8/1998 | Birckbichler |
| 6,072,859 A | 6/2000 | Kong |
| 6,181,927 B1 * | 1/2001 | Welling et al. ............ 455/414.1 |
| 6,385,584 B1 | 5/2002 | McAllister et al. |
| 6,542,603 B1 | 4/2003 | Yamagata et al. |
| 6,570,983 B1 * | 5/2003 | Speeney et al. .......... 379/373.02 |
| 6,714,637 B1 * | 3/2004 | Kredo .................... 379/215.01 |
| 6,728,354 B1 * | 4/2004 | Fleck et al. .............. 379/142.06 |
| 6,748,075 B2 | 6/2004 | Ojiro |
| 6,804,334 B1 | 10/2004 | Beasley et al. |
| 2004/0218734 A1 * | 11/2004 | Gilbert et al. .................. 379/76 |

* cited by examiner

*Primary Examiner* — Yuwen Pan
*Assistant Examiner* — Ibraham Sharifzada
(74) *Attorney, Agent, or Firm* — Heimbecher & Assoc., LLC

(57) ABSTRACT

A system 10 and method for identifying a caller using associated voice or sound announcements is disclosed. An associated voice announcement or announcements may be in calling party's own voice. The system 10 is capable of playing a different announcement in place of each ring. The different announcements may be played sequentially, randomly, or pseudo-randomly. Alternatively, a single announcement may be played in lieu of a single selected ring or in lieu of all rings after a specified ring.

16 Claims, 11 Drawing Sheets

SYSTEM AND METHOD FOR IDENTIFYING A CALLER USING ASSOCIATED SOUNDS

CROSS-REFERENCE TO RELATED APPLICATIONS

This application is a division of U.S. patent application Ser. No. 10/541,264 filed on 30 Jun. 2005 (the '264 application), now U.S. Pat. No. 7,426,269 issued on 16 Sep. 2008, as a national stage of international application no. PCT/US2003/041934 filed 31 Dec. 2003 (the '934 application) and published in English on 12 Aug. 2004 under international publication no. WO 2004/068823 A2, which claims priority to U.S. provisional patent application No. 60/437,404 filed on 31 Dec. 2002 (the '404 application). The '264 application, the '934 application, and the '404 application are all hereby incorporated by reference as though fully set forth herein.

BACKGROUND OF THE INVENTION a. Field of the Invention

The instant invention is directed toward a system and method for identifying a caller using associated sounds. More specifically, it relates to using one or more voice or sound announcements to identify a caller.

b. Background Art

So-called "caller ID" systems are well-known and readily available. The systems are also known as calling number delivery systems or CND systems. Using such systems, telephone companies offer the ability to see the name and telephone number of a caller using a display box or on a caller-ID-enabled telephone. Similar capabilities are available for both cellular and landline-based telephone users. This service may be used, for example, to screen unwanted telephone calls completely or to screen certain telephone calls at specific times of the day. Still other systems exist that permit "distinctive rings" to be used to aurally identify callers to a call-receiving party. In these systems, the telephone is programmed to ring in a certain tone pattern depending upon the identity of the caller.

U.S. Pat. No. 3,787,626 discloses a system for displaying the calling party's telephone number at the telephone set of the called party. Each of the calling locations must include a transmitter for transmitting a pulse train of audio frequency signals. The subscriber receives this signal and upon decoding the signal provides identification of the telephone number calling the subscriber. The subscriber then has the option of whether to answer the telephone.

U.S. Pat. No. 4,266,098 describes a device to screen incoming telephone calls. In the system described in the '098 patent, the identity of the caller is determined and then the call is processed accordingly. To accomplish its objectives, the '098 system responds to a three-digit code previously assigned to each caller. Upon entering the three-digit code, the caller is either connected or routed to voicemail depending upon how the system has been programmed to respond to the calls from each particular caller. For example, a call from a first caller may cause the telephone to ring normally no matter what time of day the call arrives, whereas a call from a second caller may result in the telephone ringing only during certain times of the day or not at all. Since the disposition of a call is determined by how the system is programmed in advance to respond to the call, it may provide some additional privacy but does not allow the called person to make a spontaneous decision whether to answer or ignore a particular telephone call when the call actually comes in.

U.S. Pat. No. 4,672,660 describes yet another method and system for call-receiving parties to identify telephone callers prior to answering the telephone. Each call-receiving party who received incoming calls is assigned a plurality of numbers, which the subscriber later gives to individuals and organizations from which the subscriber wishes to identify telephone calls prior to answering. When one of the individuals or organizations telephones using the number that the subscriber gave to that entity, the '660 system generates a digitally synthesized vocal announcement of at least the number being called. Since the subscriber knows the entity to which that announced number was assigned, the subscriber likewise knows the identity of the caller.

U.S. Pat. No. 5,394,445 discloses a system for aurally identifying a caller based upon the received caller ID information by playing a single prerecorded message associated with the caller ID information. The call-receiving party records a single message identifying the caller that is played when the caller ID information is matched upon receipt of an incoming telephone call. The '445 system does not disclose, for example, having multiple voice or sound announcements associated with a single telephone number, and it does not disclose the use of call announcements that are recorded in the caller's own voice.

Despite the existence of the above-mentioned systems, there remains a need for a system and method to easily and unmistakably identify callers before one picks up the telephone and without having to look at some type of display. There also remains a need for a system that is capable of playing more than one announcement in response to a single incoming telephone call.

BRIEF SUMMARY OF THE INVENTION

It is desirable to be able to easily and unmistakably identify callers before one picks up the telephone and without having to look at some type of display. Accordingly, it is an object of the disclosed invention to provide an improved system and method for a called party to identify certain incoming calls.

In one embodiment, the present invention comprises a system for identifying an incoming caller to a call-receiving party, the system comprising means for identifying a telephone number from which an incoming call has been placed; means for associating a plurality of aural announcements with the identified telephone number, wherein the plurality of aural announcements identify the incoming caller to the call-receiving party; and means for selecting and playing, upon receipt of the incoming call, a first one of the plurality of aural announcements in response to receipt of a first selected ring pulse, and for selecting and playing a second one of the plurality of aural announcements in response to receipt of a second ring pulse.

In another embodiment, the present invention comprises a system for identifying an incoming caller to a call-receiving party, the system comprising means for storing a first plurality of selectable announcements; means for detecting connection of a first telephone call to a telephone line of the call-receiving party; means for determining a telephone number of the first telephone call upon the detecting means detecting connection of the first telephone call to the telephone line of the call-receiving party; means for associating the first plurality of selectable announcements with the telephone number of the first telephone call; means for selecting a first announcement from the first plurality of selectable announcements to be played in response to a first selected ring pulse received at the telephone line; means for aurally playing the first announcement in lieu of the first selected ring pulse producing a first ringing sound; means for selecting a second announcement from the first plurality of selectable announcements to be played in response to a second selected ring pulse received at the telephone line; and means for aurally playing the second announcement in lieu of the second selected ring pulse producing a second ringing sound.

In yet another embodiment, the present invention comprises a system for aurally identifying an incoming caller before answering a telephone, the system comprising (a) associating means for associating a first plurality of aural announcements with a first telephone number and for associating a second plurality of aural announcements with a second telephone number, wherein the first plurality of aural announcements identify a first caller, and wherein the second plurality of aural announcements identify a second caller; (b) identifying means for identifying a first plurality of ring pulses generated in response to a first incoming telephone call originating from the first telephone number, and for identifying a second plurality of ring pulses generated in response to a second incoming telephone call originating from the second telephone number, (c) selecting means for (i) selecting a first aural announcement from the first plurality of aural announcements in response to a first ring pulse in the first plurality of ring pulses; (ii) selecting a second aural announcement from the first plurality of aural announcements in response to a second ring pulse in the first plurality of ring pulses; (iii) selecting a first aural announcement from the second plurality of aural announcements in response to a first ring pulse in the second plurality of ring pulses; and (iv) selecting a second aural announcement from the second plurality of aural announcements in response to a second ring pulse in the second plurality of ring pulses; and (d) playing means for (i) playing the first aural announcement from the first plurality of aural announcements in lieu of the first ring pulse in the first plurality of ring pulses; (ii) playing the second aural announcement from the first plurality of aural announcements in lieu of the second ring pulse in the first plurality of ring pulses; (iii) playing the first aural announcement from the second plurality of aural announcements in lieu of the first ring pulse in the second plurality of ring pulses; and (iv) playing the second aural announcement from the second plurality of aural announcements in lieu of the second ring pulse in the second plurality of ring pulses.

In still another embodiment, the present invention comprises a method of identifying an incoming caller. The method comprises the steps of (1) identifying the assigned telephone number from which a telephone call originates; (2) checking a storage location for at least one announcement associated with the assigned telephone number, wherein the at least one associated announcement is recorded in the incoming caller's own voice; (3) selecting a first associated announcement from the at least one announcement associated with the assigned telephone number; and (4) playing the selected first associated announcement.

In another embodiment, the present invention again comprises a method of identifying an incoming caller. In this embodiment, the method comprising the steps of (a) storing a plurality of announcements in a first memory location; (b) associating the plurality of announcements with a particular caller's telephone number; (c) monitoring a telephone line for an incoming call from the particular caller's telephone number; (d) selecting, upon receipt of the incoming call from the particular caller's telephone number at a call-receiving party's telephone, a first announcement from the plurality of announcements associated with the particular caller's telephone number; and (e) playing the first announcement in lieu of the call-receiving party's telephone ringing.

In yet another embodiment, the present invention comprises a method of identifying a telephone caller to a call-receiving party. In this embodiment, the method comprising the steps of (a) identifying a telephone number of an incoming telephone call; (b) searching a memory location for at least three aural announcements associated with the identified telephone number; (c) selecting a first aural announcement from the at least three aural announcements; (d) retrieving the first aural announcement from the memory location; and (e) playing the first aural announcement for the call-receiving party in lieu of the incoming telephone call generating a ring tone.

In each of the above-mentioned embodiments, the announcements to be played may be randomly selected or pseudo-randomly selected from a plurality of available and active announcements. Alternatively, the announcements may be played seriatim as stored.

The foregoing and other aspects, features, details, utilities, and advantages of the present invention will be apparent from reading the following description and claims, and from reviewing the accompanying drawings.

DETAILED DESCRIPTION OF THE INVENTION

The present invention comprises a system and method that permit a call-receiving party to aurally identify a caller without personally answering a telephone call. The system includes a Caller Announce Unit (CAU) 10 (see, e.g., FIGS. 2-5) that permits a prior recording of the caller's actual voice, for example, to announce an incoming call to the call-receiving party. In particular, one or more previously-recorded digital or analog announcements are selected and played via the CAU 10. If a plurality of announcements is associated with the telephone number of a particular caller, the CAU may be configured to selectively play those announcements in an order desired by the call-receiving party. The desired order may be, for example, random, pseudo-random, or sequential. In general, the CAU, among other things, (i) stores one or more announcements; (ii) associates the stored announcement(s) with the telephone number of a particular caller; (iii) answers an incoming call; and (iv) processes all of the logic (as explained further below), which includes the set-up logic depicted in FIG. 1A-1C, and the call-processing logic depicted in FIGS. 6A-6E for identifying a caller and playing any available announcement or announcements in the desired order.

In one embodiment, the call-receiving party subscribes to caller-ID service provided by a telephone service provider. Upon receiving an incoming telephone call, the CAU resolves the telephone number of the incoming call and plays a previously-recorded announcement rather than merely displaying the name or telephone number of the calling party. The announcement may include the calling party's actual voice delivering a desired statement (e.g., "Hey Bob, it's Joe, pick up the phone."), and the announcement may change with each "ring" of the telephone.

As used herein, the term "caller" or "calling party" includes anyone trying to establish communication with a call-receiving party having a CAU according to the present invention by placing a telephone call or by sending an email or by delivering any other message. "Callers" thus include, for example, telephone callers, whether from a landline or a cellular connection, and people sending emails or text messages. As used herein, the term "call" includes a telephone call, an email, a text message, or any other message made, sent, or delivered in an attempt to communicate with a call-receiving party. The term "announcement" is used herein to mean an audible, actual voice sample from a calling party or any other sounds (e.g., musical sounds, animal or other natural sounds, motorcycle sounds, or synthesized sounds) that the call-receiving party wants to associate with calls from a particular calling party. For ease of description, a preferred embodiment of the invention is described below by focusing on how the CAU may be used to identify a caller placing a telephone call to a call-receiving party.

Figure 1A:
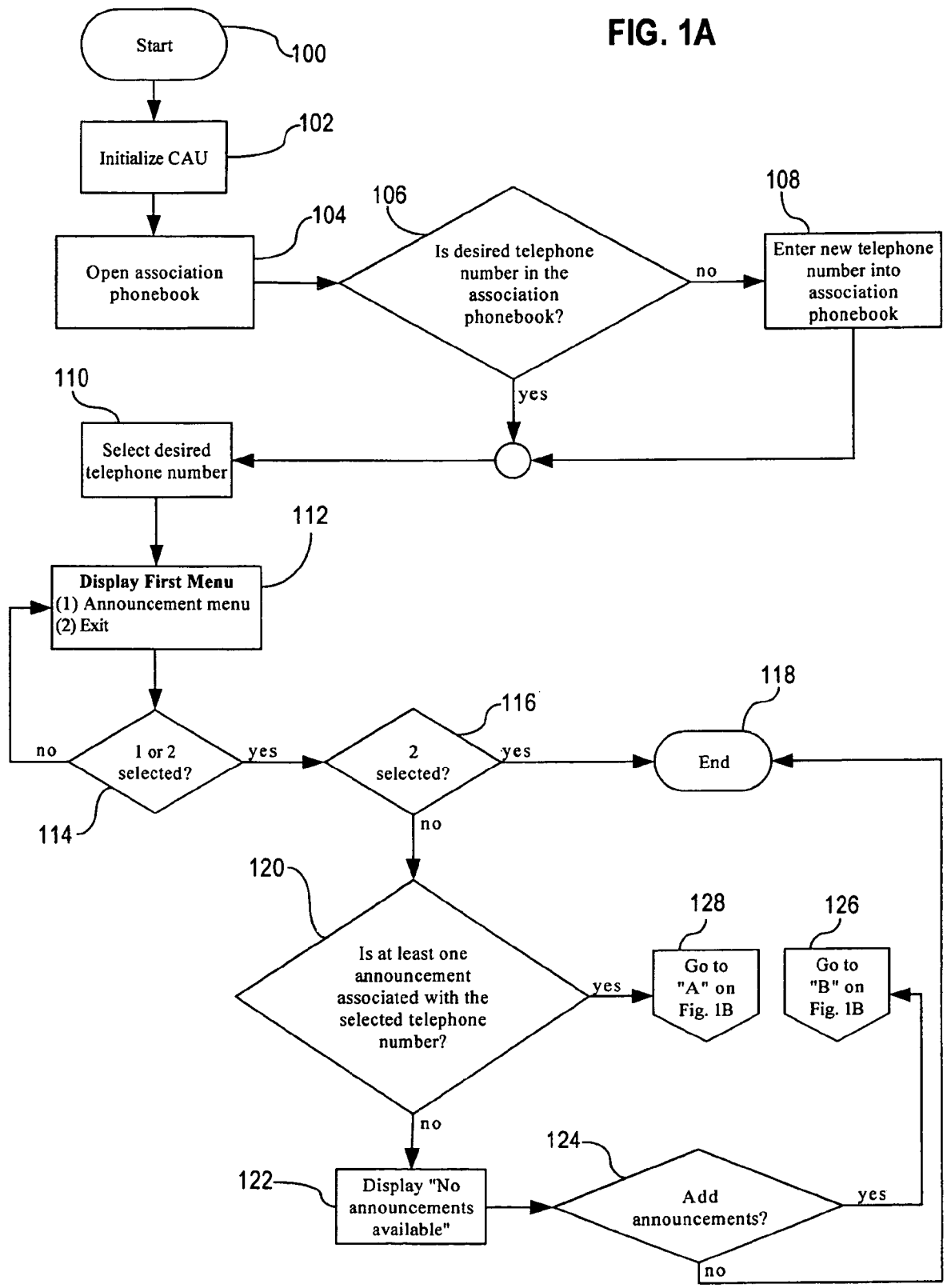
FIGS. 1A-1C depict a flowchart of a control program that may be used to set up a Caller Announce Unit or CAU according to one embodiment of the present invention.
Figure 1B:
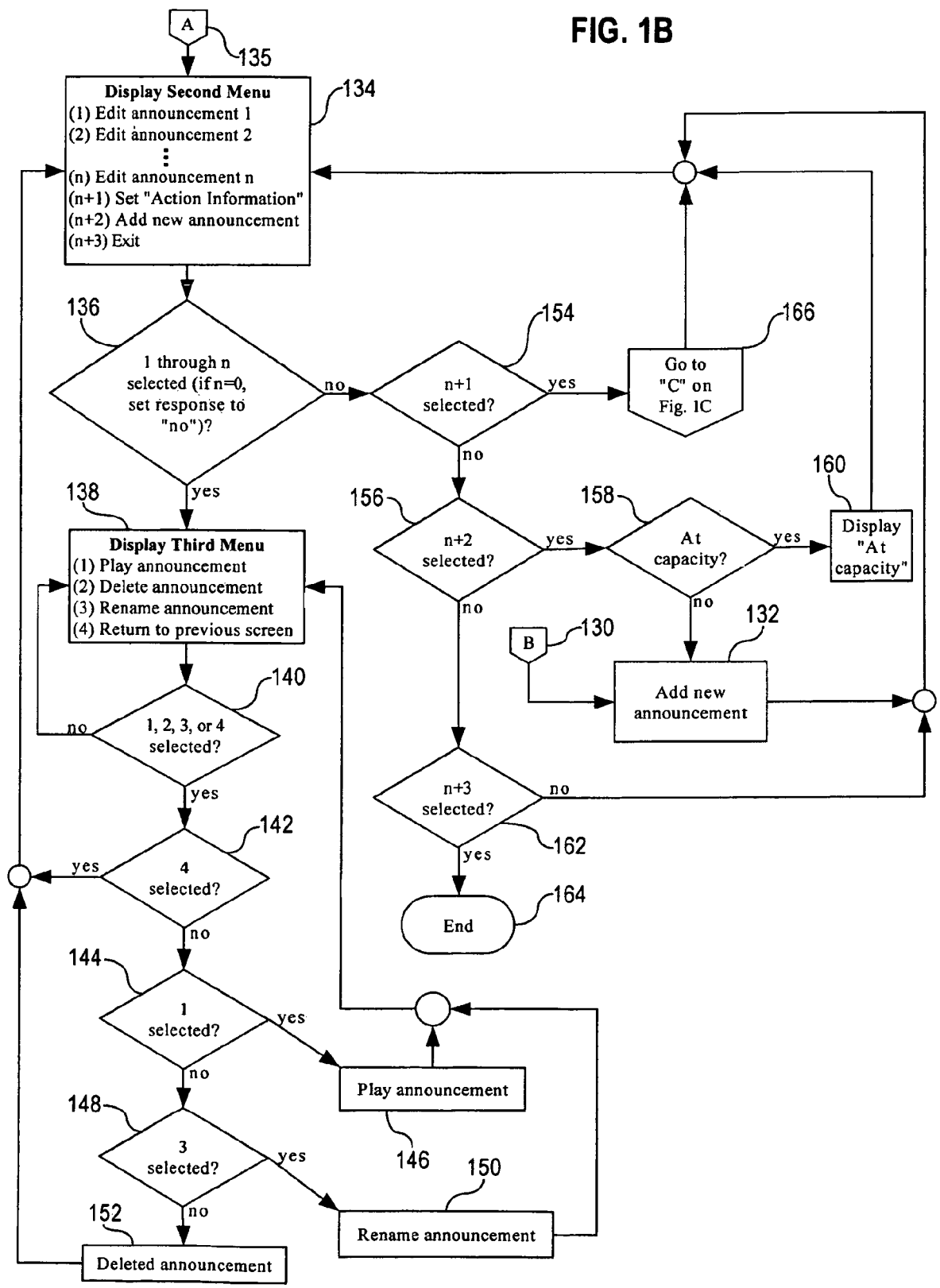
Figure 1C:
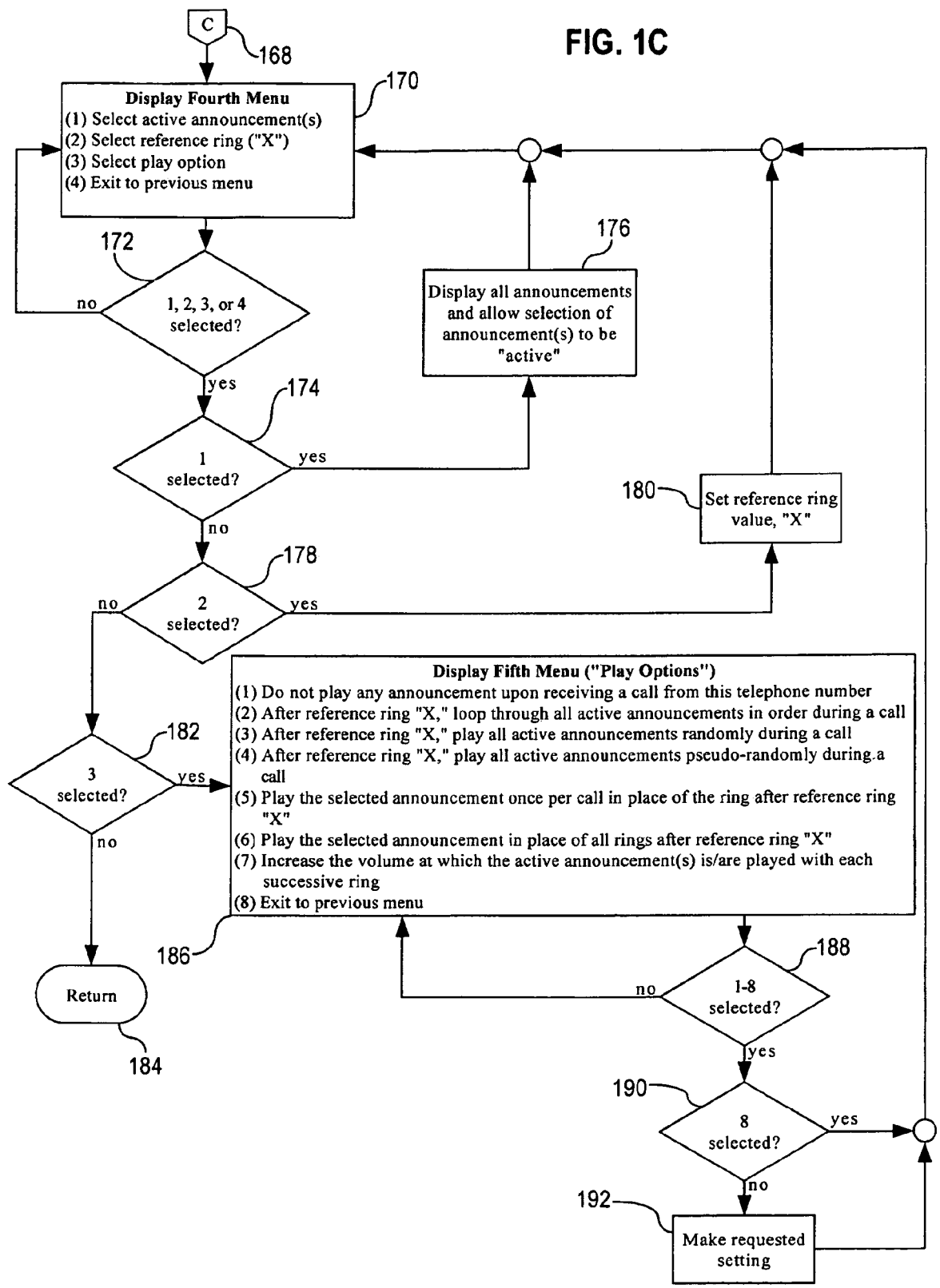

Referring most specifically to FIGS. 1A-1C, a control program that may be used to set up a CAU 10 according to one embodiment of the present invention is described next. The process starts at block 100. At block 102, the CAU is initialized. During initialization, the CAU's operating parameters are checked, its memory is checked, and any number of other checks may be performed to ensure that the CAU is functioning as expected. Initialization occurs automatically upon powering up the CAU (e.g., by pressing an on/off button 40 on the CAU 10—see FIG. 4, which is a front view of one possible configuration for a CAU). Initialization also may be done manually by, for example, pressing a button 42 (FIG. 4) on the CAU 10. At block 104, the CAU opens an association phonebook. When the association phonebook is open, information about the callers from whom the call-receiving party already has received telephone calls, or the callers from whom the call-receiving party expects to receive telephone calls, are displayed on a screen 30 (see FIG. 3, which is a top plan view of one possible configuration for a CAU). The information displayed may include, for example, the caller's name and telephone number. It is possible to pan through the listed telephone numbers using an up button 32 and a down button 34 (FIG. 3).

At decision point 106, the control program learns whether the telephone number for which the call-receiving party desires to be able to identify callers is already present in the association phonebook. For example, the person setting up the CAU may begin entering the desired telephone number using keys on an alphanumeric keypad 36 (FIG. 3). As the keys are pressed, the closest match to the number being entered is displayed in a box 38 on the screen 30. If the desired telephone number is present in the association phonebook, it will appear in the box 38 at some point while the number is being keyed in. If the desired telephone number is not already present in the association phonebook, the new telephone number must be fully entered using the alphanumeric keypad 36. Alternatively, for numbers already in the association phonebook, the person setting up the CAU may use only the up button 32 and the down button 34 to locate the desired telephone number.

Figure 3:
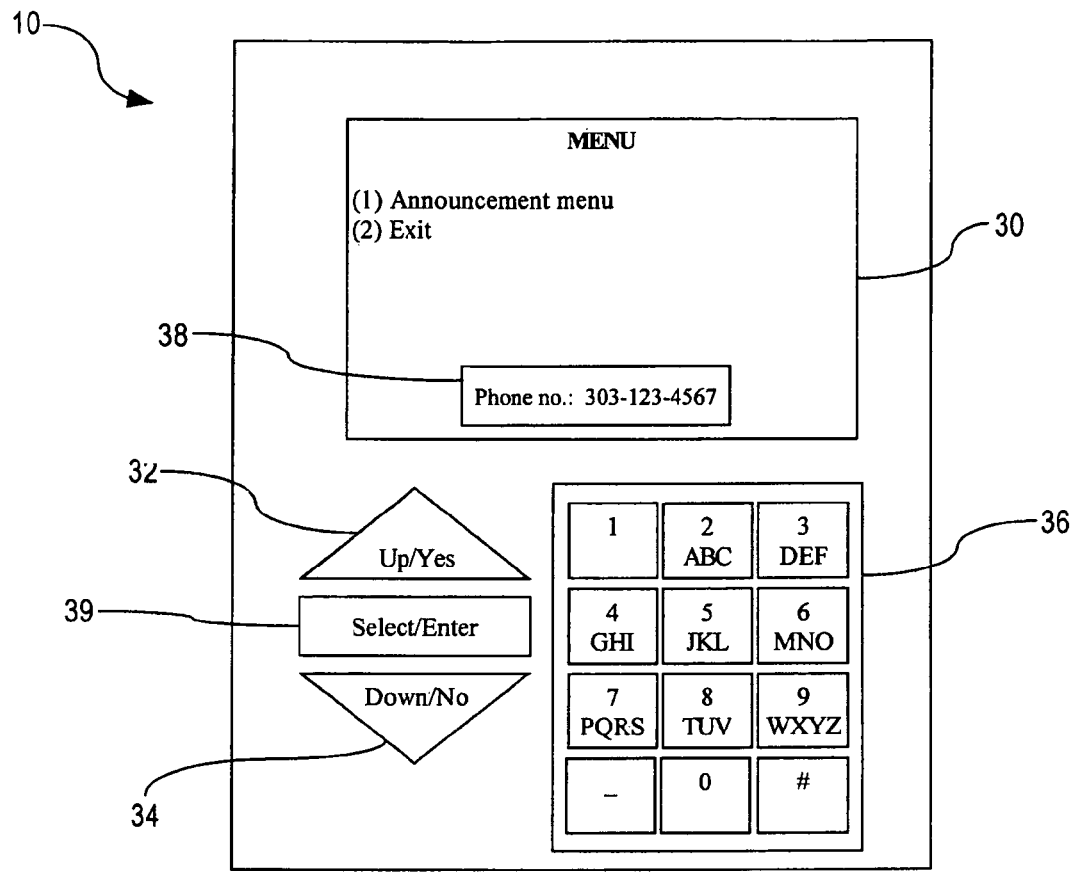
FIG. 3 is a top plan view of a CAU depicting one possible configuration.
Figure 4:
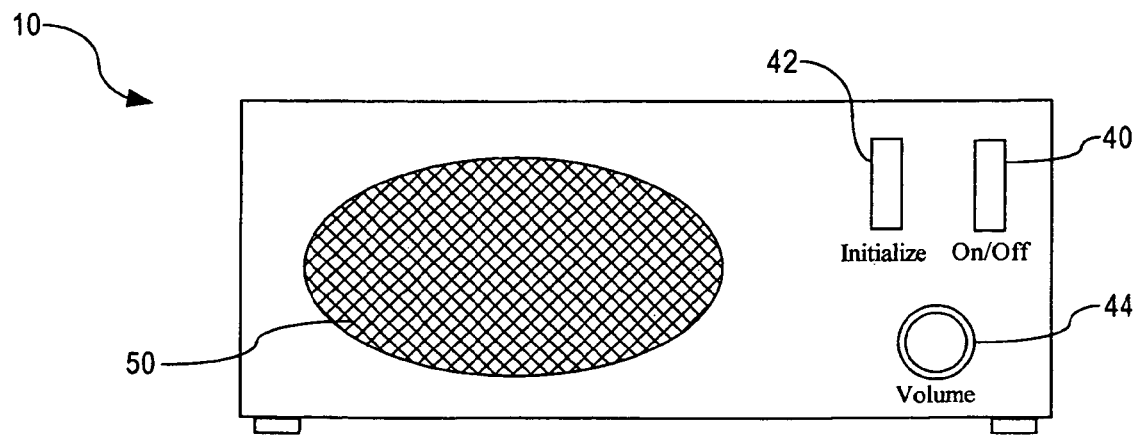
FIG. 4 is a front view of the CAU depicted in FIG. 3.

Once a new telephone number has been fully entered (block 108) or an existing telephone number has been located using one of the previously described techniques, the number is selected at block 110 by, for example, pressing the Select/Enter button 39 (FIG. 3). Then, control transfers to block 112 where a first menu is displayed. This first menu provides an access point for setting up the CAU. At decision point 114, the system determines whether a valid menu selection has been made using, for example, the alphanumeric keypad 36. If not, the system continues to display the first menu and waits for a valid keypad entry. Once a valid selection has been made, control transfers to decision point 116. If option (2) was selected from the first menu, the set-up program ends (block 118), and the CAU 10 returns to an idle screen.

If, on the other hand, option (1) was selected from the first menu, control transfers to decision block 120 where the set-up program determines whether at least one announcement has already been associated with the selected telephone number. If no announcement is already associated with the selected telephone number, the CAU 10 indicates this on its display 30 at block 122, and the CAU asks whether announcements are to be added (decision point 124). If no new announcements are to be added, control transfer to block 118, the set-up program ends, and the CAU returns to an idle screen.

If at decision point 124, the program determines that new announcements are to be added, control is transferred to block 126, which is an off-page connector symbol transferring control to block 130 on FIG. 1B. From block 130, the set-up program next advances to block 132 and begins the process for adding a new announcement. The process 200 of adding a new announcement is depicted schematically in FIG. 2.

Figure 2:
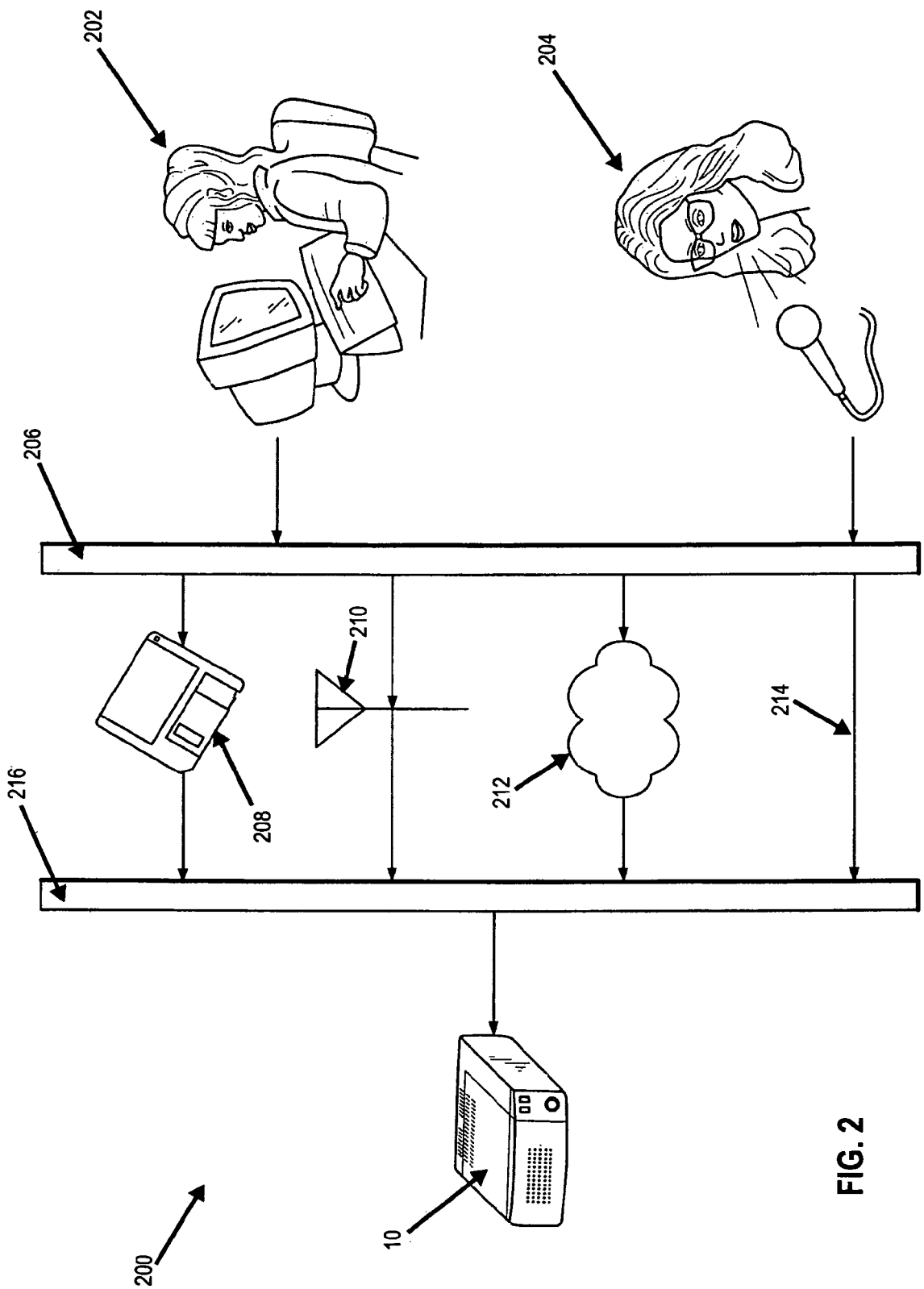
FIG. 2 is a schematic representation of a number of techniques for delivering announcements to the CAU for association with incoming telephone calls from a particular caller.

FIG. 2 is a schematic representation of a number of techniques for delivering announcements to the CAU 10 for association with a particular telephone number. In the embodiment of the invention depicted in FIG. 2, new announcements may include previously-manipulated materials as well as spontaneously-originated materials. Item 202 schematically represents previously-manipulated materials being delivered to the CAU 10, and item 204 schematically represents spontaneously-originated materials being delivered to the CAU 10. Previously-manipulated materials may include, for example, spoken words or sounds that have been somehow altered before being delivered to the CAU. Spontaneously-originated materials may include, for example, substantially unaltered spoken words and sounds, or combinations of these, being delivered to the CAU 10.

FIG. 2 depicts a distribution bar 206, which schematically connects one of the announcement sources 202, 204 to a variety of announcement delivery means, including a portable storage device 208 (e.g., floppy disk, ZIP® disk, flash memory card, removable tape, hard drive, CD, DVD), an antenna 210 representing wireless delivery of the announcement (e.g., Wi-Fi, 802.11a, 802.11b, 802.11g, cellular), a computer network 212 (e.g., the Internet), and a hardwired, direct connection 214. Distribution bar 216 schematically connects each of the announcement delivery means to the CAU 10. Any connection (e.g., USB, serial, parallel, FireWire, infrared) or other hardware or software interface that may be required to connect an announcement source 202, 204 to the CAU 10 is subsumed by the distribution bars 206, 216 and the announcement delivery means 208-214 depicted in FIG. 2. Examples include, but are not limited to, the following: (i) directly connecting a microphone to a port on the CAU 10 itself or incorporating a microphone into the CAU 10 itself; (ii) writing an announcement to a flash memory card and subsequently inserting the flash memory card into a slot on the CAU 10 itself; (iii) transferring an announcement to a memory location on the CAU 10 via a CAU antenna (not shown) using cellular technology (e.g., the same technology used to wirelessly transfer ring tones and icons to modern cellular telephones); and (iv) connecting the CAU 10 to the Internet using a modem and downloading an announcement directly into a memory location on the CAU 10. If the CAU 10 includes or is connected to an answering machine, the system also permits conversion of a voicemail message into an announcement. For example, the caller may leave a voicemail message on the call-receiving party's answering machine that is to be played to announce future telephone calls from that caller. The CAU 10 may be configured to permit direct or indirect conversion of the voicemail message into an announcement to facilitate identification of the caller during future telephone calls.

The schematic depiction of FIG. 2 not only represents the delivery of an announcement to the CAU, but also represents association of the delivered announcement with a particular telephone number.

Returning to FIG. 1B, after at least one announcement has been associated with a telephone number, control is transferred to block 134, where a second menu is displayed. This second menu offers the option to edit the announcement that was just recorded, and is the menu to which control would have been transferred in block 128 (FIG. 1A) if at least one announcement had already been associated with the selected telephone number when decision point 120 was previously reached. In this latter scenario, the logic would move from decision point 120 to off-page transfer block 128, which would transfer control to corresponding off-page transfer block 135 on FIG. 1B before reaching block 134 where the second menu is displayed. At decision point 136, the logic begins resolving what action is to be taken by checking to see whether one of the announcements is to be edited. If in fact an existing announcement is to be edited, control is transferred to block 138. At block 138, a third menu is displayed, giving the options of playing the announcement, deleting the announcement, renaming the announcement, or returning to the previous menu. At decision point 140, the program loops continuously until one of the four available options is selected.

When one of the available options has been selected, control transfers to decision point 142, where the logic checks to see if it should return to the second menu. In particular, if option (4) has been selected, control is returned to block 134, and the second menu is again displayed. If option (1), (2), or (3) has been selected, the logic moves to decision point 144. If at decision point 144 it is determined that option (1) was selected, the selected announcement is played at block 146 (e.g., through the speaker 50 (see FIG. 4)), and then the third menu is again presented at block 138. If, on the other hand, it is determined that option (2) or option (3) was selected, then control passes to decision point 148. At decision point 148, the logic checks to see whether option (3) was selected. If it is true that option (3) was selected, the user is given an opportunity to rename the selected announcement at block 150 before control is returned to block 138 and the third menu is again displayed. At block 150, the logic permits the renaming of the particular selected announcement using the alphanumeric keypad 36 shown to good advantage in FIG. 3, which is a top plan view of one possible configuration for a CAU 10.

If at decision point 148 the logic determines that option (3) was not selected, the logic then knows that option (2) had been selected and deletes the selected announcement at block 152 before control is returned to block 134 and the second menu is again displayed.

Returning to decision point 136 on FIG. 1B, if it is determined that an item other than items (1) to (n) has been selected from the second menu, control transfers to decision point 154. It should be noted that, whenever no announcements are available for the selected telephone number (e.g., if at block 152, the only announcement gets deleted before control returns to block 134 to display the second menu), only the last two options shown on the second menu (i.e., option n+2 and option n+3) will be available. That is, when no announcements exist, the only options are to add a new announcement (option n+2) or to exit the second menu (option n+3), which would return the system to the idle screen. This is true since you cannot edit nonexistent announcements, and you cannot tell the logic how or when to play nonexistent announcements.

If at decision point 154 it is determined that option (n+1) was not selected, control transfers to decision point 156 where the logic establishes whether option (n+2) was selected. If option (n+2) was in fact selected, control transfers to decision point 158. At decision point 158, the CAU 10 determines whether is has reached any capacity limits—for example, whether no additional announcements may be associated with the selected telephone number (assuming such a limit exists) and whether the total available memory has been used. If the CAU 10 has reached some type of capacity limit, a message is displayed at block 160 before control is returned to block 134 and the second menu is displayed. If a capacity limit has been reached, the logic prevents option (n+2) from being available on the second menu (e.g., it might be grayed out and unselectable). If at decision point 158 the logic determines that no capacity problems exist, control is transferred to block 132 and the user is given the opportunity to add a new announcement as previously discussed before control returns to block 134 and the second menu is again displayed.

Returning to decision point 156 on FIG. 1B, if the logic determines that option (n+2) was not selected from the second menu, control is transferred to decision point 162 where the logic checks to see whether option (n+3) was selected. If option (n+3) was selected, control transfers to end block 164 and the display returns to an idle screen. It should also be noted that if decision block 162 determines that option (n+3) was not selected, the logic concludes that other than options (1) to (n), (n+1), (n+2), or (n+3) was selected, which would be an invalid selection, causing the logic to loop back to block 134, where the second menu would again be displayed.

Returning to decision point 154 on FIG. 1B, if the logic determines that option (n+1) was selected from the second menu, control is transferred via off-page connection point 166 to corresponding connection point 168 on FIG. 1C and then to block 170 where a fourth menu is displayed. The fourth menu is used to set "action information," including selecting which announcements will be active for a particular telephone number (i.e., the "active announcement or announcements", what ring number must occur before the logic plays announcements in lieu of letting the telephone ring (i.e., the "reference ring"), and how the active announcements are to be played (i.e., the "play option"). The "action information" may be set up to affect all telephone numbers for which the CAU 10 has announcement information, or it may be set up phone-number-by-phone-number.

At decision point 172, the logic determines whether a valid option has been selected. If not, the logic continues to loop back to block 170 and displays the fourth menu until a valid selection is made. If a valid selection is made (i.e., option (1), (2), (3), or (4) is selected), control transfers to decision point 174. If option (1) was selected, control transfers to block 176, and the user is allowed to select which of the available announcements for a particular telephone number will be active. The logic permits all of the available announcements or a subset of the available announcements to be active. For example, there may be four available announcements, but the user may only want to use three of them for now. The CAU 10 may be configured to accept the user's temporary selection of three out of the four available announcements without making the user delete the fourth announcement. This saves the user from having to re-enter the fourth announcement if the user later decides to include the temporarily unused fourth announcement among the announcements that may end up being played. Also, if no announcements are made active, the telephone would ring normally when calls are received from the selected telephone number without the user being required to delete all of the announcements from the CAU. After the active announcements are set, the logic returns to block 170 and redisplays the fourth menu. If at decision point 174 the logic determines that option (1) was not selected, control transfers to decision point 178.

At decision point 178, the logic determines whether option (2) was selected. If the answer is "yes," control transfers to block 180. At block 180, the "reference ring" is assigned to variable "X." By selecting or setting the "reference ring," the user tells the CAU 10 which ring pulse is to be used as a reference point for starting to play one or more announcements in place of rings, as explained further below. It should be noted further that, as explained further below, the "reference ring" value is ignored if the "play option" (discussed in detail below) is set to "do not play announcement" (i.e., option (1) from the fifth menu, which is displayed at block 186 on FIG. 1C). If the "play option" is set to "do not play announcements," the telephone rings normally until either the telephone is answered or the caller hangs up.

The "reference ring" is set by the user to a whole number greater than or equal to zero. The "reference ring" is stored as variable "X" and represents the number of normal or "standard" rings to occur before any selected announcement is played. For example, if "play option" were set to (5) (see the fifth menu at block 186 on FIG. 1C) and "X" were set to "2," the phone would ring normally for the first two rings, then an announcement would be played in place of the third ring, and then the phone would ring normally in response to the fourth and all subsequent ring pulses from the telephone line. If "play option" is set to (6) (see the fifth menu) and "X" is set to "0," selected announcement "n" would be played in place of the first ring and all subsequent rings (i.e., the telephone would never ring normally). The "reference ring" could also represent a particular ring to be replaced by an announcement.

If at decision point 178, the logic determines whether option (2) was not selected from the fourth menu (see block 170 on FIG. 1C), the logic transfers to decision point 182. If decision point 182 determines that option (3) was not selected, the logic knows that option (4) was selected from the fourth menu and transfers control to return block 184, which returns the logic to off-page transfer point 166 on FIG. 1B and ultimately to block 134 on FIG. 1B, which causes the second menu to be redisplayed. If, on the other hand, the answer is "yes" at decision point 182 (i.e., option (3) from the fourth menu was selected), control transfers to block 186. At block 186, the fifth menu, which is the "play option" menu, is displayed.

At decision point 188, the logic checks to see if a valid option has been selected. If a valid selection was not made, the logic continuously loops back to block 186 until a valid selection is made. If a valid menu selection has been made, the logic transfers control to decision point 190. If at this decision point 190 the logic determines that the user desires to exit to the fifth menu, control returns to block 170, which displays the fourth menu. If, on the other hand, the logic determines at decision point 190 that the user has made a valid "play option" selection, control transfers to block 192 where the selected play option is stored by the logic before control returns to block 170, which again displays the fourth menu.

By selecting or setting the "play option," the user tells the CAU 10 how to select and play the active announcement or announcements in place of one or more rings. In other words, by selecting a particular "play option," the user sets the CAU 10 to take no action or to take a specific action. The "play option" could, for example, be set to one of the following values:

(1) Do not play announcement upon receiving a call from this telephone number
(2) After reference ring "X," loop through all active announcements in order during a call
(3) After reference ring "X," play all active announcements randomly during a call
(4) After reference ring "X," play all active announcements pseudo-randomly during a call
(5) Play the selected announcement once per call in place of the ring after reference ring "X"
(6) Play the selected announcement in place of all rings after reference ring "X"
(7) Increase the volume at which the active announcement (s) is/are played with each successive ring Under "play option" (1) from the fifth menu (see FIG. 1C), the phone would ring normally and no announcements, even if available, would be played. Optionally, the CAU 10 could be set up to ring normally, but to increase the volume with each ring by selecting play options (1) and (7). This "increasing-volume feature," which is discussed further below, could be applied to any of the "play options."

Under "play option" (2) from the fifth menu, the CAU would loop through all active announcements, playing, for example, a first active announcement in place of the first ring, a second active announcement in place of the second ring, a third active announcement in place of the third ring, and so on, until each of the active announcements has been played once, and then the CAU would start over playing the first active announcement in place of the next ring if the phone continues to ring, and so on, until the phone is answered or the caller hangs up. The CAU begins playing active announcements after reference ring "X." For example, if "X" were set to two, the telephone would ring normally twice, and the third ring would be replaced by the first active announcement.

Under "play option" (3), the CAU 10 would play one of the active announcements at random in place of, for example, the first ring, play a second one of the active announcements at random in place of the second ring, play a third one of the active announcements at random in place of the third ring, and so on, until the phone is answered or the caller hangs up. When the "play option" is set to option (3) on the fifth menu, the CAU plays the announcements in a truly random order (e.g., even if five announcements were active, the announcement played in place of the first ring could be the same as the announcement played in place of the second ring). The CAU begins playing the randomly-selected announcements after reference ring "X." For example, if "X" were set to three, the telephone would ring normally three times, and the fourth ring would be replaced by the first randomly-selected announcement. Then, the fifth ring would be replaced by the second randomly-selected announcement, as so on, until the telephone is answered or the caller hangs up.

Under "play option" (4) from the fifth menu, the CAU 10 would play one of the active announcements at random in place of, for example, a first ring, play a second one of the active announcements at random in place of the second ring, play a third one of the active announcements at random in place of the third ring, and so on, until the phone is answered or the caller hangs up. This option is different from option (3) in that under option (4), the CAU plays the announcements pseudo-randomly, being required, for example, to play each of the active announcements once before repeating any particular active announcement. Under this "play option," the CAU begins playing the pseudo-randomly-selected announcements after reference ring "X." For example, if "X" were set to one, the telephone would ring normally one time, and the second ring would be replaced by the first pseudo-randomly-selected announcement. Then, the third ring would be replaced by the second pseudo-randomly-selected announcement, as so on, until the telephone is answered or the caller hangs up.

Under "play option" (5) on the fifth menu (see block 186), the CAU 10 would play a particular selected announcement associated with a phone number only once, and the phone would otherwise ring normally. The selected announcement would be played in place of the ring after reference ring "X."

Under "play option" (6) on the fifth menu, the CAU 10 would play a particular selected announcement associated with a telephone number over-and-over no matter how many different announcements are active. The selected announcement would be played in place of all normal rings after reference ring "X." If "X" were set to zero, the telephone would never ring normally, and the selected announcement would be played in place of all normal rings.

Under "play option" (7) on the fifth menu, the CAU 10 would increase the volume at which each active announcement is played with each successive ring. This option may be selected whenever at least two announcements are to be played (i.e., play option (2), (3), or (4)) or whenever the same announcement is to be repeated (i.e., play option (6)).

It should be noted that if only one announcement is available for a particular telephone number, or if only one of several available announcements is made active in block 176 (FIG. 1C), the logic may only permit selection of options (1), (5), (6), or (7) from the fifth menu (block 186) to remind the user that only a single announcement is active for the particular telephone number. Similarly, if more than one announcement has been made active for a particular telephone number, the logic may not permit selection of option (5) or option (6) from the fifth menu since the logic will be unable to determine which of multiple active announcements to play.

Clearly, other options are possible. For example, the "play option" could be set to play announcements pseudo-randomly, but also require that a particular announcement cannot be played more than two times before each of the active announcements has been played at least once. Another possible "play option" would be to allow the telephone to ring normally every other time during a single call, alternating with one or more announcements that play between normal rings (e.g., ring normally—play active announcement 1—ring normally—play active announcement 2—ring normally, etc.; or ring normally—play active announcement 1—play active announcement 2—ring normally—play active announcement 3—play active announcement 4—ring normally, etc.). As yet another alternative, the "play option" could be set to replace every ring that is a whole number multiple of a user-selected number with the active announcement(s).

Similarly, the CAU 10 could be configured to randomly select a first announcement and then play it in lieu of all normal rings during a first call from a first caller. Then, during a second call from the first caller, a new random announcement could be selected and played in lieu of all normal rings during the second call. Or, the CAU 10 could be configured to select a first active announcement and play it in lieu of all rings during a first call from a first caller. Then, during a second call from the first caller, a second active announcement could be automatically selected to play in lieu of all normal rings during the second call. Then, during a third call from the first caller, a third active announcement could be automatically selected to play in lieu of all normal rings during the third call, as so on.

Figure 5:
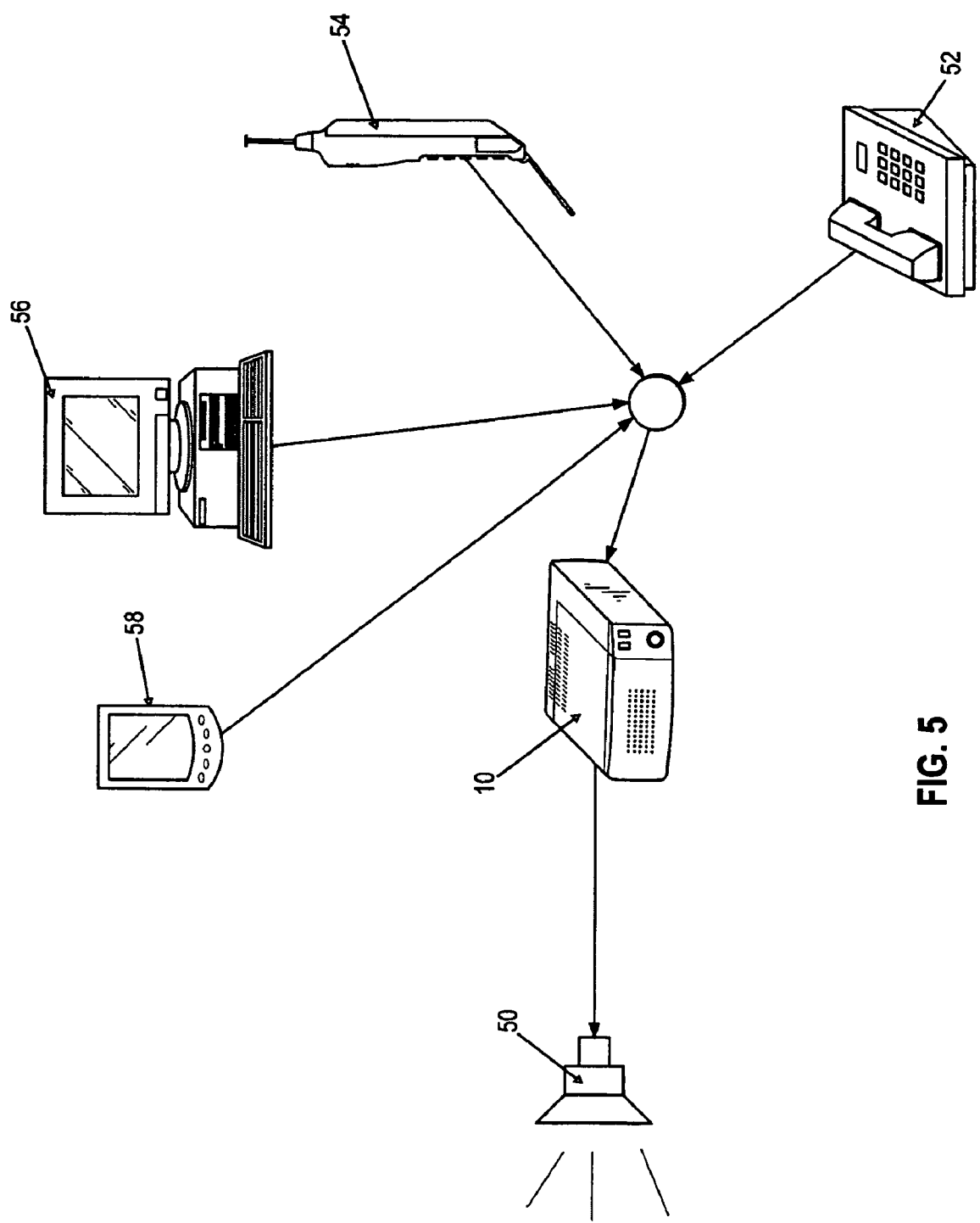
FIG. 5 is a schematic representation of an incoming call being announced by the CAU.

FIG. 5 is a schematic representation of an incoming call being announced through a speaker 50 by the CAU 10. The CAU may include a volume control knob 44 (see FIG. 4). As shown in FIG. 5, the CAU 10 is capable of receiving "calls" from a variety of sources, including, for example, landline telephones 52, mobile telephones 54, computers 56, and handheld device or other message sources 58. In order to determine when to play an announcement and which announcement to play, a control program comprising an integral part of, or associated with, the CAU 10 may follow the logic presented in the flowchart of FIGS. 6A-6E, which is discussed next.

Figure 6A:
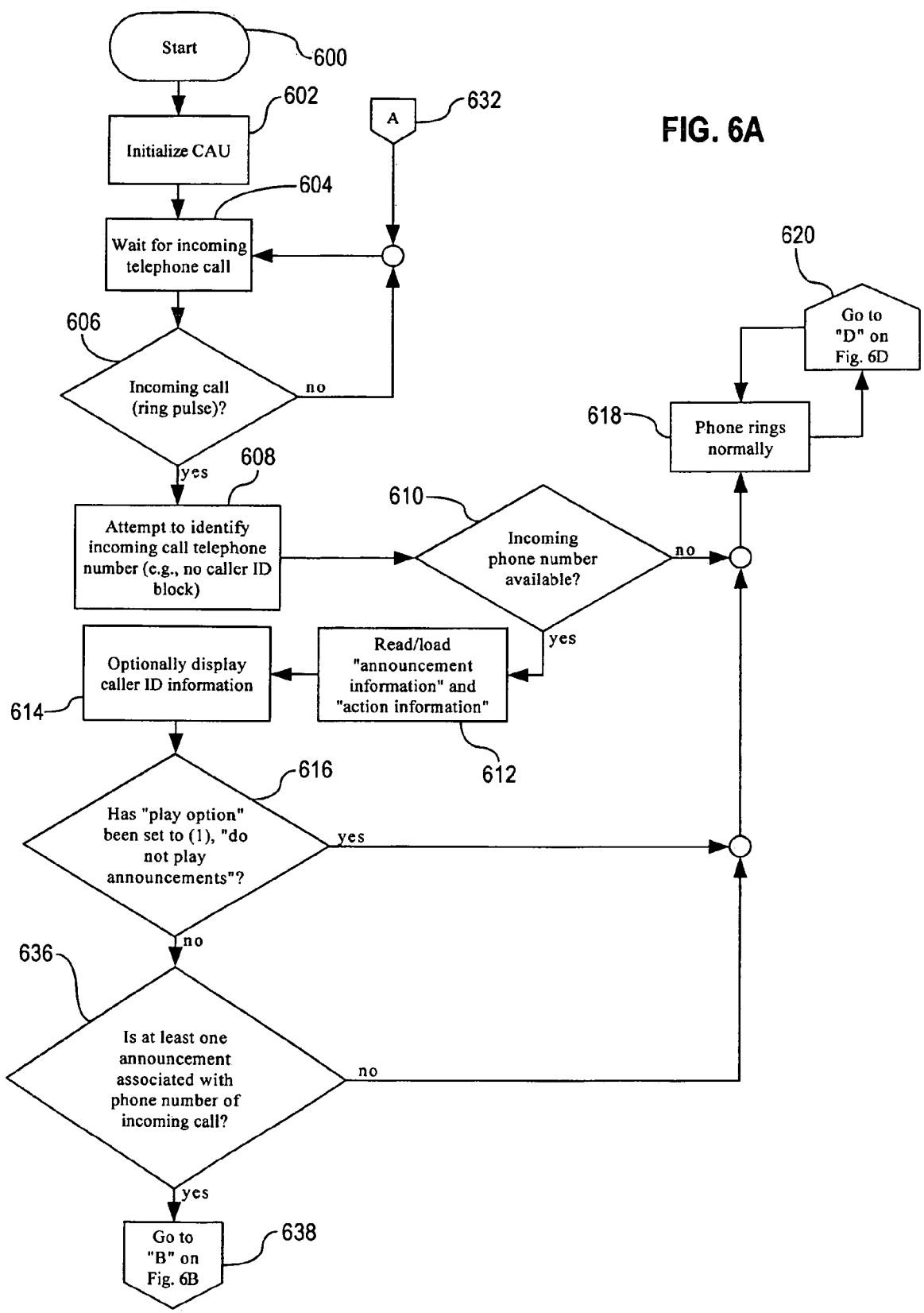
FIGS. 6A-6E depict a flowchart of a control program that may be used to operate the CAU according to one embodiment of the present invention.
Figure 6B:
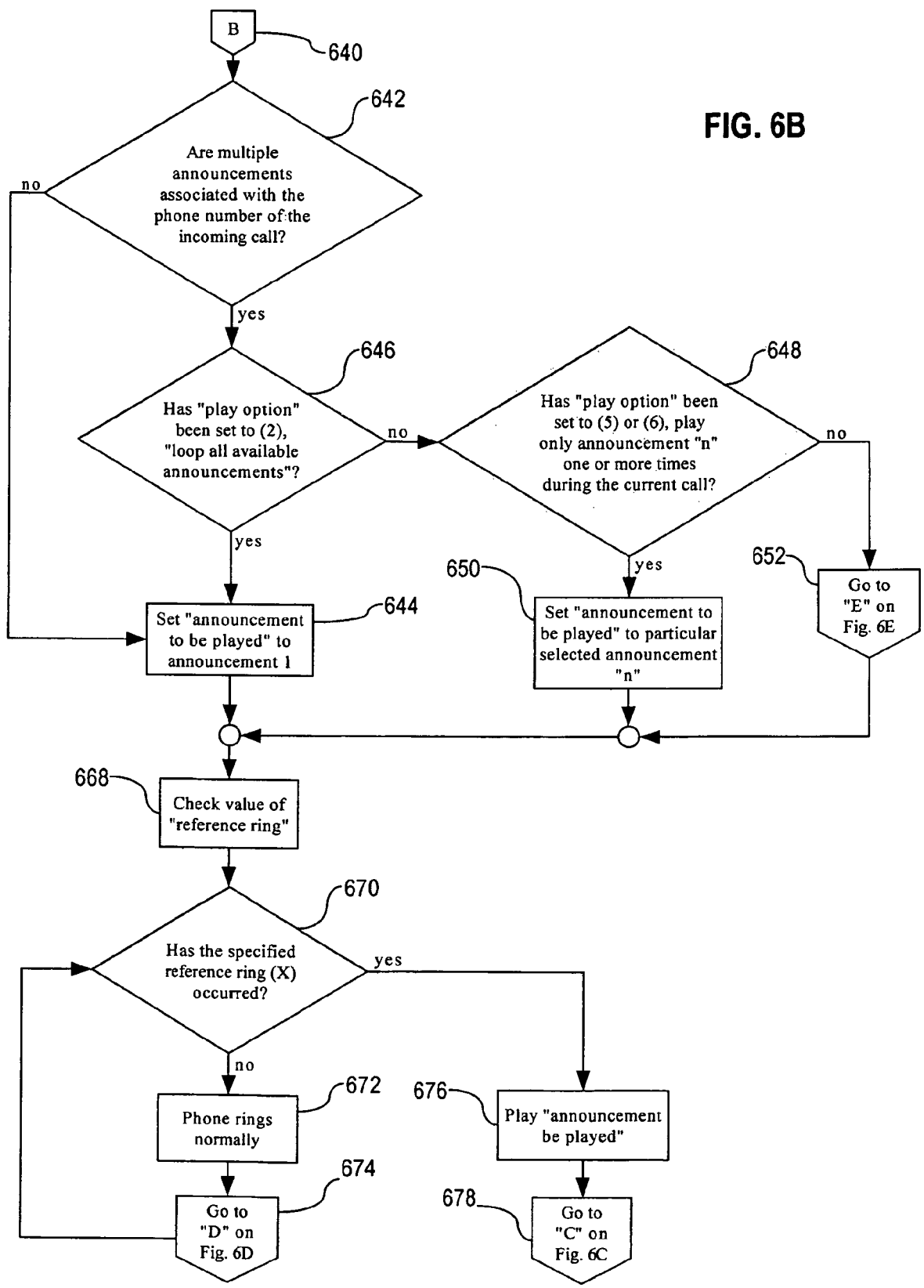

Referring first to FIG. 6A, from start block 600, the logic transfers to block 602. At block 602, the CAU 10 is initialized. Initialization of the CAU was previously discussed. Following initialization, control transfers to block 604 where the CAU waits for an incoming telephone call. At decision block 606, the system monitors a telephone line for an incoming call. If no incoming telephone call is detected, the system continues to loop between block 604 and decision point 606. Upon detection of an incoming telephone call, the logic goes to block 608 and attempts to identify the telephone number of the incoming call. This may be completed, for example, using standard caller ID service provided by telephone service providers. At decision point 610, the logic checks to see if the system was able to resolve the telephone number of the incoming call. If the logic is unable to resolve the telephone number of the incoming telephone call, control transfers to block 618 and the telephone may rings normally. After block 618, control is transferred to off-page transfer block 620, which advances the program to corresponding block 622 on FIG. 6D. The logic in the portion of the flowchart presented in FIG. 6D is explained further below. Essentially, this logic monitors the telephone line for ring pulses so that the system may respond appropriately. Alternatively, rather than ringing normally when the CAU is unable to resolve the telephone number of an incoming telephone call, the system could be programmed to reject such an unidentifiable incoming call, without or with an announcement to the caller (e.g., "The number you have called rejects incoming calls like this one that block caller ID information.") and could announce through the CAU, "An incoming call was just rejected for blocking caller ID information."

Returning to decision point 610, if the logic is able to resolve the telephone number of the incoming telephone call, control transfers to block 612. At block 612, the "announcement information" and the "action information" is read or loaded. The "announcement information" includes all announcements themselves. The "announcement information" could include, for example, the following for a selected telephone number:

Announcement 1: "It's Bob, pick up."
Announcement 2: "I'm not going to wait much longer—I'm on my cellular—pick up."
Announcement 3: "Don't you want to talk with me?"
Announcement 4: "Catch you later."

As previously discussed, the "action information" includes information concerning which announcements are active, the reference ring information, and the play option. For the above sample announcements, assume that play option (2) was selected for telephone calls from the specified telephone number, and assume that announcements 1, 2, and 4 are the only active announcements. If the reference ring is set to "0," then "It's Bob, pick up" would be played in lieu of the first ring, "I'm not going to wait much longer—I'm on my cellular—pick up" would be played in lieu of the second ring, and "Catch you later" would be played in lieu of the third ring. This announcement "family" would work well for a caller who typically hangs up after the third or fourth ring. If the caller lets the telephone continue to ring beyond the third ring in this example, the system would either start over with announcement 1 or would thereafter ring normally at the call-receiving party's choice.

Referring again to FIG. 6A, after the system reads or loads the "announcement information" and the "action information" into its active memory at block 612, control transfers to block 614. At block 614, the system displays, if desired, the call information it has resolved from the caller ID service as is done in a prior art caller ID system. Then, at decision point 616, the logic begins to decipher how it is going to play the announcement(s) it has now loaded for the identified incoming telephone call. In particular, if play option (1) has been selected (see box 186 on FIG. 1C), control transfers to block 618, and the telephone rings normally (i.e., as though the CAU is not connected to the telephone line). After block 618, control is transferred to off-page transfer block 620, which takes the program to corresponding block 622 on FIG. 6D.

The logic in the portion of the flowchart presented in FIG. 6D monitors the telephone line for ring pulses so that the system may respond appropriately. At decision point 624 the system expects a ring pulse. If one is sensed, control transfers to return block 626. Under the current example, return block 626 return the system to block 620, which now transfers the logic back to block 618 where the telephone again rings normally. After the telephone rings again normally, the logic again goes to off-page transfer block 620, which again takes the program to corresponding block 622 and then to decision point 624 on FIG. 6D. Assuming that no ring pulse is detected at decision point 624, control is transferred to decision point 628. At decision point 628, the system resolves whether the telephone has been answered. The system can tell if someone answered the telephone in any known way (e.g., by monitoring line load). If the system determines that the telephone has actually been answered at decision point 628, control is transferred to off-page transfer block 630, which takes the program to corresponding block 632 on FIG. 6A and then returns the system to block 604 on that figure, where the logic starts waiting for the next incoming telephone call. If at decision point 628 (FIG. 6D) the logic determined that the telephone had not been answered, then control is transferred to decision point 634. At this decision point 634, the logic determines whether the system has "timed out." In particular, the system can determine that a caller hung up by, for example, tracking time elapsed between ring pulses from the telephone line. If too much time elapses between ring pulses, the system could "time out" due to an excessive period since the last ring pulse. If the system has not timed out (i.e., if the system remains "optimistic" that a ring is on the horizon), it transfers control back to block 624 where it again checks for a new ring pulse. If, on the other hand, the logic determines at decision block 634 that the caller must have hung up, control is again transferred to off-page transfer block 630, which takes the program to corresponding block 632 on FIG. 6A and then returns the system to block 604 on that figure, where the logic again starts waiting for the next incoming telephone call.

Returning to decision point 616 on FIG. 6A, a different scenario is now considered. If the logic determines that one or more announcements are to be played (i.e., if the answer to the question posed in decision block 616 is "no"), the system must determine whether there are any announcements to be played. This check is accomplished at decision block 636. If no announcements exist for the telephone number from which a telephone call is being received, control is again transferred to block 618, and the process previously described is again carried out. If, on the other hand, decision point 636 determines that at least one announcement is available for the telephone number associated with the incoming telephone call, control is transferred via off-page transfer block 638 to corresponding block 640 on FIG. 6B and then to decision point 642 on that figure. At decision point 642, the logic determines whether there are multiple announcements associated with the telephone number for the incoming call. If there is only one announcement associated with the incoming call, control is transferred to block 644, where the announcement to be played is set to announcement 1.

Returning to decision point 642, if the logic determines that there are in fact multiple announcements associated with the telephone number for the incoming telephone call, the system must determine which announcement is to be played first. Thus, control is transferred to decision point 646. At this decision point the system check to see if play option (2) has been selected. Play option (2) requires that the system loop through all active announcements in order after reference ring "X." If play (2) was in fact selected, control transfers to block 644, where the announcement to be played is set to announcement 1.

Returning to decision point 646, if the logic determines that play option (2) was not selected, the system next determines whether play option (5) or play option (6) was selected. It makes this latter determination at decision point 648. If play option (5) or play option (6) was in fact selected, control is transferred to block 650, where the announcement to be played is set to the particular announcement n selected by the call-receiving party (a) to be played once per call in place of the ring after reference ring "X" (if option (5) was selected); or (b) to be played in place of all rings after reference ring "X" during the call (if option (6) was selected).

Figure 6C:
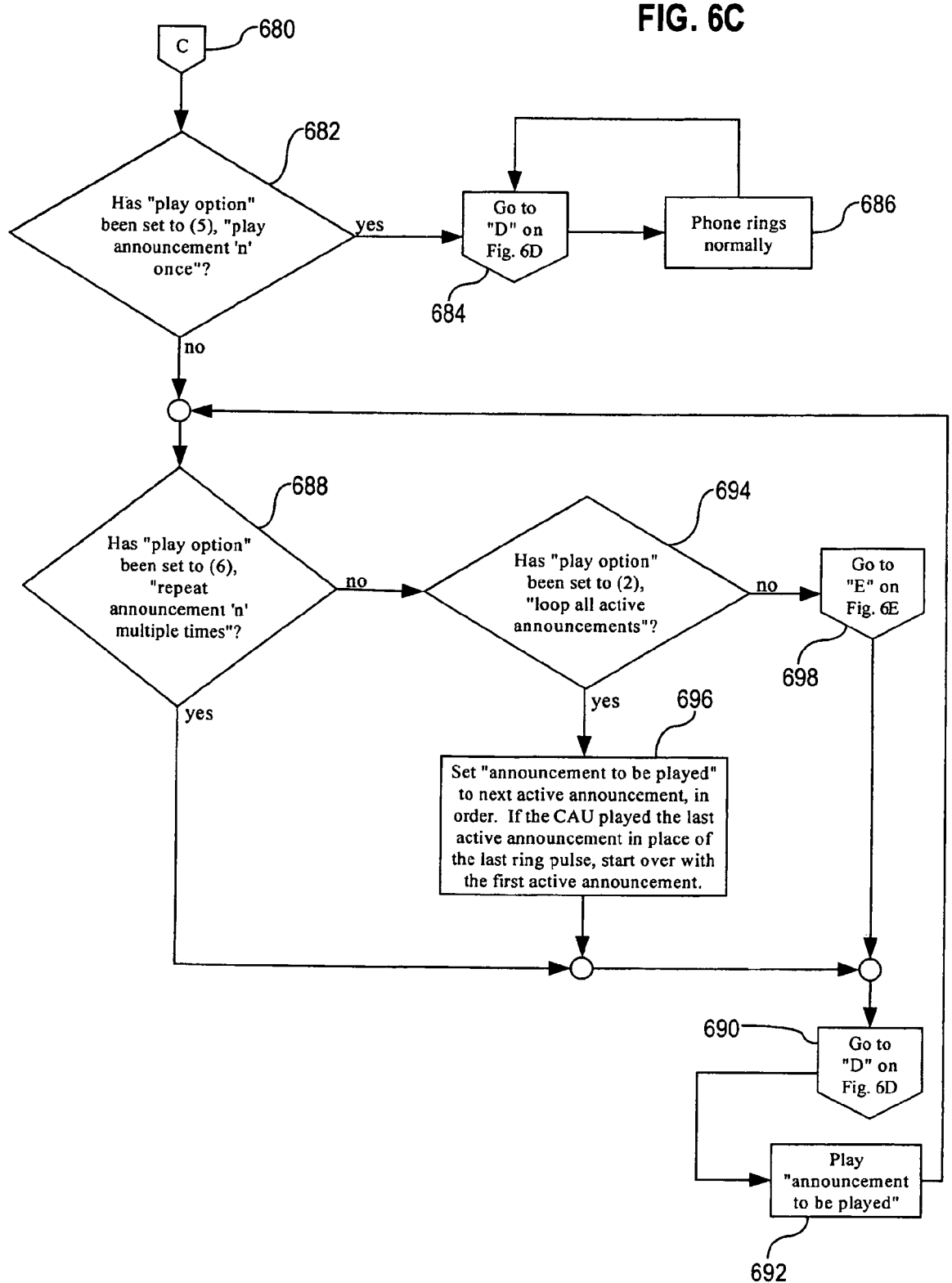
Figure 6D:
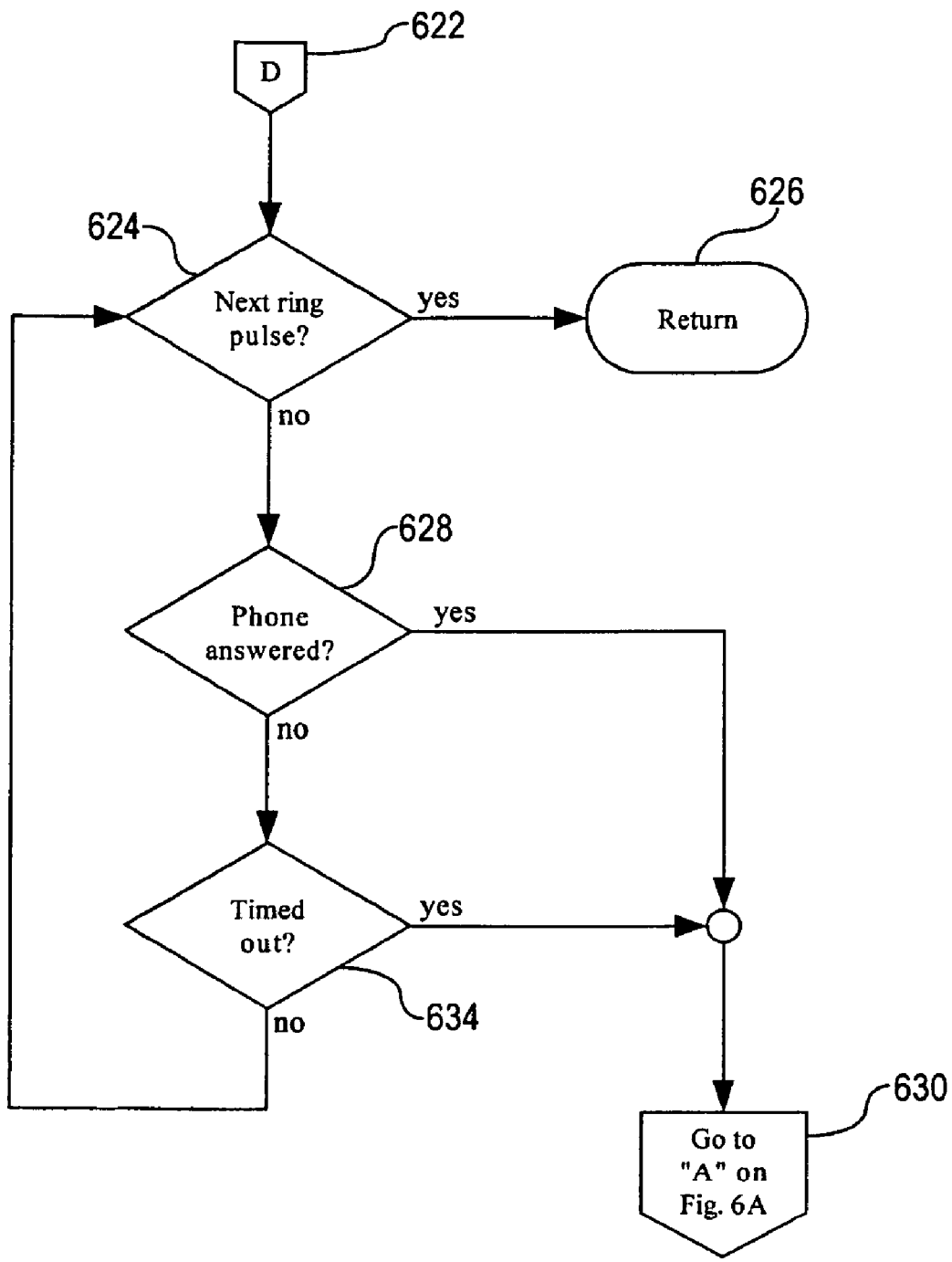
Figure 6E:
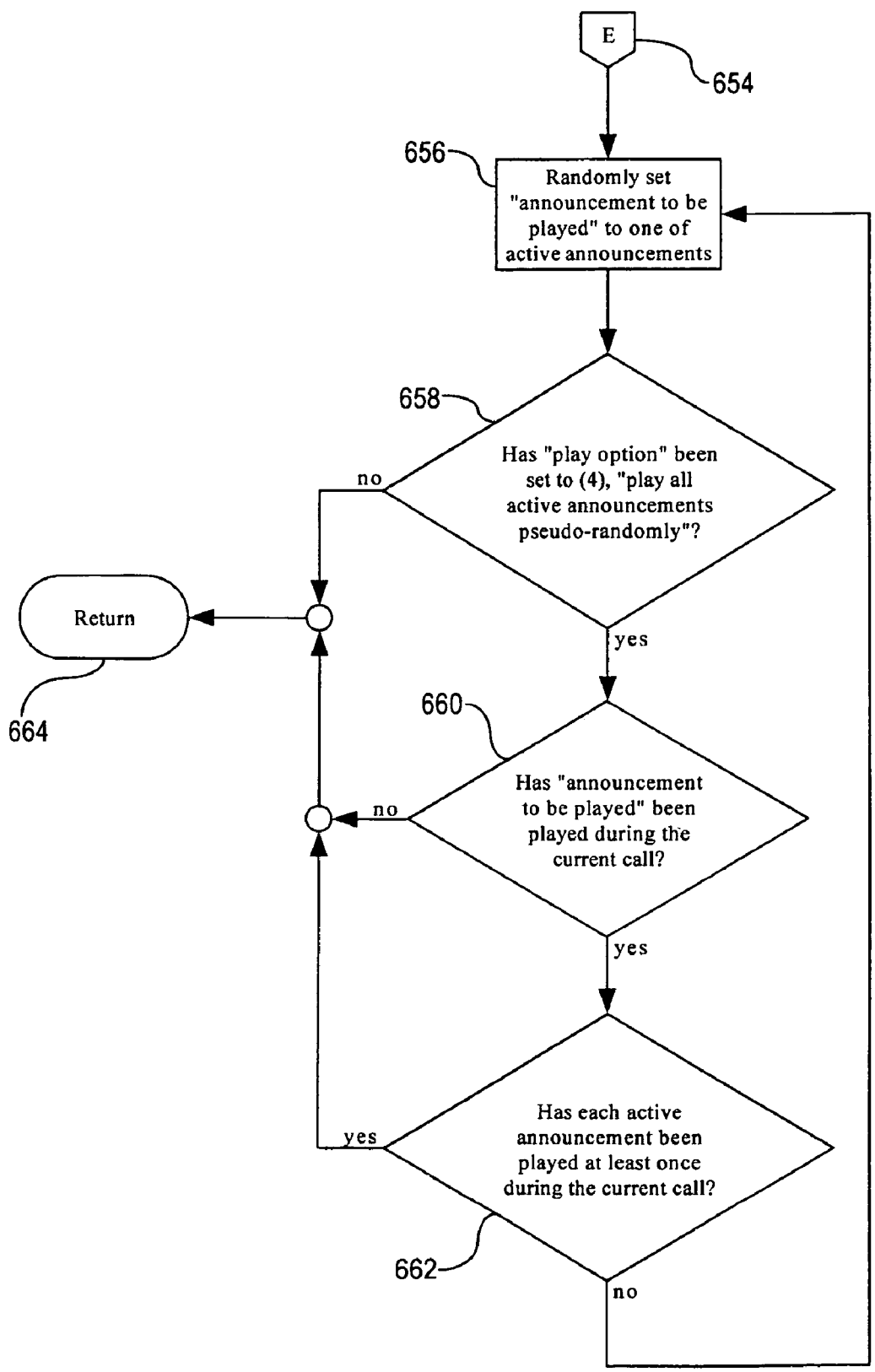

Returning to decision point 648, if the logic determines that neither play option (5) nor play option (6) was selected, control is transferred to off-page connector symbol 652, which transfers control to block 654 on FIG. 6E. From block 654, the logic next moves to block 656, where it randomly sets the announcement to be played to one of the active announcements. Control is subsequently transferred to decision point 658, where the logic determines whether play option (4) was selected. Play option (4) requires that the system play all active announcements pseudo-randomly after reference ring "X." If play (4) was in fact selected, control transfers to decision point 660, where the system checks whether the announcement to be played has already been played during the current telephone call. If the announcement that is currently selected to be played has already been played, control is transferred to decision point 662. At decision point 662, the logic checks to see if all of the active announcements have been played at least once during the current telephone call. If all of the active announcements have not yet been played at least once during the current telephone call, control is transferred back to block 656, where a different active is randomly selected to be played. Decision points 658, 660, and 662 thereby ensure that each active announcement is played at least once before any active announcement is played a second time during a telephone call whenever the call-receiving party has set the CAU 10 to play the active announcements pseudo-randomly. Once the logic sets the announcement to be played according to this logic, control is transferred to block 664, which returns the system to block 652 on FIG. 6B.

Returning to decision point 658 on FIG. 6E, if the play option (4) was not selected, the system knows that play option (3) must have been selected. Play option (3) requires that the system play all active announcements randomly after reference ring "X." That being the case, the logic immediately goes to block 664 after randomly selecting one of the active announcements to be played. Block 664 returns the system to block 652 on FIG. 6B.

Returning to FIG. 6B, control now transfers to block 668. At this point the logic has set the announcement to be played according to one of the logic paths previously described. At this point the system thus knows what announcement it is to play, so it must determine whether it is time to play the selected announcement. At decision point 670, the logic resolves whether the reference ring "X" has occurred. If it has not occurred, the logic is transferred to block 672, and the telephone rings normally. After the telephone rings, the logic advances to off-page transfer block 674, which transfers control to corresponding off-page transfer block 662 on FIG. 6D. As previously discussed, the logic on FIG. 6D monitors the telephone line for any one of the following events to occur: the next ring pulse, the telephone being answered, or the telephone caller to hanging up. If the next ring pulse occurs before the telephone is answered and before the caller hangs up, return block 626 on FIG. 6D returns control to block 674 on FIG. 6B, which now sends the logic back to decision point 670 to determine if the specified reference ring "X" has occurred. Assuming that the specified reference ring "X" has in fact occurred, the logic advances to block 676, where the "announcement to be played" is actually played through the speaker of the CAU 10. The logic then advances to off-page transfer block 678, which transfers control to corresponding off-page transfer block 680 on FIG. 6C.

Referring to FIG. 6C, the logic for selecting the announcement, if any, to be played in place of rings after the first ring is described next. At decision point 682, the logic determines whether play option (5) has been selected. Under "play option" (5) on the fifth menu (see block 186), the CAU 10 is to play a particular selected announcement associated with a phone number only once, and the phone otherwise rings normally. Thus, if at decision point 682 the logic determines that play option (5) was selected, control advances to off-page transfer block 684, which transfers control to corresponding off-page transfer block 622 on FIG. 6D. As previously explained, the logic depicted in FIG. 6D monitors the telephone line for any one of the following events to occur: the next ring pulse, the telephone being answered, or the telephone caller hanging up. If the next ring pulse occurs before the telephone is answered and before the caller hangs up, return block 626 on FIG. 6D returns control to block 686 on FIG. 6C. At block 686, the telephone rings normally since the announcement has already been played once, satisfying play option (5). The logic then returns to off-page transfer block 684, which again transfers control to corresponding off-page transfer block 622 on FIG. 6D. This looping occurs with the telephone ringing normally until either the telephone is answered or the caller hangs up.

Returning to decision point 682, if other than play option (5) has been selected, the logic advances to decision point 688, where the logic determines whether play option (6) has been selected. If play option (6) is active, the selected announcement is to be played in place of all rings after reference ring "X." To accomplish this, the logic advances to off-page transfer block 690, which transfers control to corresponding off-page transfer block 622 on FIG. 6D. As previously explained, the logic depicted in FIG. 6D monitors the telephone line for any one of the following events to occur: the next ring pulse, the telephone being answered, or the telephone caller hanging up. If the next ring pulse occurs before the telephone is answered and before the caller hangs up, return block 626 on FIG. 6D returns control to block 690 on FIG. 6C. The logic subsequently advances to block 692, which plays announcement n again under this scenario. The logic then returns to decision point 688. This looping occurs with announcement n being played in place of each telephone ring until either the telephone is answered or the caller hangs up.

Returning to decision point 688, if other than play option (6) has been selected, the logic advances to decision point 694, where the logic determines whether play option (2) has been selected. If play option (2) is active, the system is to loop through all active announcements in order during a call after reference ring "X" occurs. To accomplish this, the logic advances to block 696 where the announcement to be played is set to the next active announcement in order. If the CAU 10 played the last active announcement in lieu of the immediately prior ring, the first active announcement is selected as the next announcement to be played. The logic then advances to off-page transfer block 690, which transfers control to corresponding off-page transfer block 622 on FIG. 6D. As previously explained, the logic depicted in FIG. 6D monitors the telephone line for any one of the following events to occur: the next ring pulse, the telephone being answered, or the telephone caller hanging up. If the next ring pulse occurs before the telephone is answered and before the caller hangs up, return block 626 on FIG. 6D returns control to block 690 on FIG. 6C. The logic subsequently advances to block 692, which plays the queued-up announcement. The logic then returns to decision point 688. This looping occurs with the active announcements being played in order in place of each telephone ring until either the telephone is answered or the caller hangs up.

Returning to decision point 694, if play option (2) has not been selected, the logic knows that the active announcement is to be played randomly or pseudo-randomly. Control thus advances to off-page transfer block 698, which transfers control to corresponding off-page transfer block 654 on FIG. 6E. As discussed above, the logic depicted on FIG. 6E either randomly or pseudo-randomly queues up the next announcement to be played. Once the next announcement to be played has been selected, return block 664 on FIG. 6E transfers control back to off-page transfer block 698. From there, the logic advances to off-page transfer block 690, which transfers control to corresponding off-page transfer block 622 on FIG. 6D. As previously explained, the logic depicted in FIG. 6D monitors the telephone line for any one of the following events to occur: the next ring pulse, the telephone being answered, or the telephone caller hanging up. If the next ring pulse occurs before the telephone is answered and before the caller hangs up, return block 626 on FIG. 6D returns control to block 690 on FIG. 6C. The logic subsequently advances to block 692, which plays the queued-up announcement that was randomly or pseudo-randomly selected. The logic then returns to decision point 688. This looping occurs with the next randomly or pseudo-randomly selected active announcement being played in place of each telephone ring until either the telephone is answered or the caller hangs up.

Although several embodiments of this invention have been described above with a certain degree of particularity, those skilled in the art could make numerous alterations to the disclosed embodiments without departing from the spirit or scope of this invention. For example, the CAU may comprise a number of separate components. The CAU may be built into the call-receiving party's telephone (whether a landline telephone or a cellular telephone), it may comprise part of an answering machine, or it may comprise a standalone unit. The CAU also could be implemented using a computer. Further, the CAU 10 could be configured to allow for association of the same set of announcements to more than one telephone number (e.g., the same announcements could be associated with both the cellular telephone number and the work telephone number of a single caller if the call-receiving party only cares who is calling and not necessarily the number from which the call in being placed). Also, although the CAU according to the present invention does not itself directly manipulate announcements (e.g., permit changing of tones or clean-up of static or removal of certain portions or rearranging of the parts of an announcement to form a new announcement), a more sophisticated CAU could be made to perform these additional functions. The CAU may also be configured to play an announcement while the call-receiving party is conducting a telephone conversation with another party. This latter feature would work similar to a "call waiting" function, but an announcement would be played rather than the "tone" that is typically played in existing systems. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of identifying an incoming caller, the method comprising the following steps:
   (1) identifying an assigned telephone number from which a telephone call originates;
   (2) checking a storage location for a plurality of announcements associated with said assigned telephone number, wherein each announcement of said plurality of announcements is also associated with a call-receiving party's telephone number; and
   (3) selecting and playing, during a single telephone call, at least two associated announcements from said plurality of announcements, wherein said at least two associated announcements includes a first associated announcement and a second associated announcement, wherein said first associated announcement is different from said second associated announcement, and wherein, after said first associated announcement is played via a speaker in lieu of a first ring, said second associated announcement is played via said speaker in lieu of a second ring.

2. A method of identifying an incoming caller, the method comprising the following steps:
   storing a plurality of announcements in a first memory location;
   associating said plurality of announcements with a particular caller's telephone number;
   associating said plurality of announcements with a call-receiving party's telephone line;
   monitoring said call-receiving party's telephone line for an incoming call from said particular caller's telephone number;
   selecting, upon receipt of the incoming call from said particular caller's telephone number at said call-receiving party's telephone line, a first announcement from said plurality of announcements;
   playing said first announcement via a speaker in lieu of said call-receiving party's telephone ringing a first time;
   selecting a second announcement seriatim from said plurality of announcements; and
   playing said second announcement via said speaker in lieu of said call-receiving party's telephone ringing a second time.

3. A method of identifying a telephone caller to a call-receiving party, the method comprising the following steps:
   identifying a telephone number of an incoming telephone call;
   searching a memory location for at least three aural announcements associated with said identified telephone number and associated with the call-receiving party;
   selecting a first aural announcement from said at least three aural announcements;
   retrieving said first aural announcement from said memory location;
   playing said first aural announcement on a speaker for the call-receiving party in lieu of said incoming telephone call generating a first ring tone;
   selecting a second aural announcement from said at least three aural announcements, wherein said second aural announcement is selected seriatim from said at least three aural announcements;
   retrieving said second aural announcement from said memory location; and
   playing said second aural announcement on said speaker for the call-receiving party in lieu of said incoming telephone call generating a second ring tone.

4. A system for announcing a particular communication sender of an incoming communication to a particular communication recipient, the system comprising the following:
   a first storage device adapted to store parameters indicative of the particular communication sender;
   a second storage device adapted to store a plurality of outgoing announcements associated with the particular communication sender when attempting to communicate with the particular communication recipient;
   a receiver adapted to receive the incoming communication;
   an identifier adapted to identify an identified parameter of the incoming communication;
   a comparator adapted to compare the identified parameter of the incoming communication to said stored parameters in said first storage device and to thereby identify the particular communication sender;
   a selector adapted to select both a first selected outgoing announcement and a second selected outgoing announcement from said plurality of outgoing announcements, wherein said first selected outgoing announcement is different from said second outgoing announcement; and
   an output device adapted to sequentially output said first and second selected outgoing announcements during a single attempt by said particular communication sender to reach said particular communication recipient to identify the particular communication sender.

5. A method of identifying an incoming caller, the method comprising the following steps:
   (1) identifying an assigned telephone number from which a telephone call originates;
   (2) checking a storage location for a plurality of announcements associated with said assigned telephone number, wherein each announcement of said plurality of announcements is also associated with a call-receiving party's telephone number;

(3) randomly selecting and playing, during a single telephone call, at least two associated announcements from said plurality of announcements, wherein said at least two associated announcements includes a first associated announcement and a second associated announcement, wherein said first associated announcement is different from said second associated announcement, and wherein, after said first associated announcement is played via a speaker in lieu of a first ring, said second associated announcement is played via said speaker in lieu of a second ring.

6. A method of identifying an incoming caller, the method comprising the following steps:
(1) identifying an assigned telephone number from which a telephone call originates;
(2) checking a storage location for a plurality of announcements associated with said assigned telephone number, wherein each announcement of said plurality of announcements is also associated with a call-receiving party's telephone number;
(3) pseudo-randomly selecting and playing, during a single telephone call, at least two associated announcements from said plurality of announcements, wherein said at least two associated announcements includes a first associated announcement and a second associated announcement, and wherein, after said first associated announcement is played via a speaker in lieu of a first ring, said second associated announcement is played via said speaker in lieu of a second ring.

7. A method of identifying an incoming caller, the method comprising the following steps:
storing a plurality of announcements in a first memory location;
associating said plurality of announcements with a particular caller's telephone number;
associating said plurality of announcements with a call-receiving party's telephone line;
monitoring said call-receiving party's telephone line for an incoming call from said particular caller's telephone number;
randomly selecting, upon receipt of the incoming call from said particular caller's telephone number at said call-receiving party's telephone line, a first announcement from said plurality of announcements;
playing said first announcement in lieu of said call-receiving party's telephone ringing a first time;
randomly selecting a second announcement from said plurality of announcements; and
playing said second announcement in lieu of said call-receiving party's telephone ringing a second time, wherein said first announcement and said second announcement are both played via a speaker.

8. A method of identifying an incoming caller, the method comprising the following steps:
storing a plurality of announcements in a first memory location;
associating said plurality of announcements with a particular caller's telephone number;
associating said plurality of announcements with a call-receiving party's telephone line;
monitoring said call-receiving party's telephone line for an incoming call from said particular caller's telephone number;
pseudo-randomly selecting, upon receipt of the incoming call from said particular caller's telephone number at said call-receiving party's telephone line, a first announcement from said plurality of announcements;
playing said first announcement in lieu of said call-receiving party's telephone ringing a first time;
pseudo-randomly selecting a second announcement from said plurality of announcements; and
playing said second announcement in lieu of said call-receiving party's telephone ringing a second time, wherein said first announcement and said second announcement are both played via a speaker.

9. A method of identifying a telephone caller to a call-receiving party, the method comprising the following steps:
identifying a telephone number of an incoming telephone call;
searching a memory location for at least three aural announcements associated with said identified telephone number and associated with the call-receiving party;
randomly selecting a first aural announcement from said at least three aural announcements;
retrieving said first aural announcement from said memory location;
playing said first aural announcement on a speaker for the call-receiving party in lieu of said incoming telephone call generating a first ring tone;
randomly selecting a second aural announcement from said at least three aural announcements;
retrieving said second aural announcement from said memory location; and
playing said second aural announcement on said speaker for the call-receiving party in lieu of said incoming telephone call generating a second ring tone.

10. A system for announcing a particular communication sender of an incoming communication to a particular communication recipient, the system comprising the following:
a first storage device adapted to store parameters indicative of the particular communication sender;
a second storage device adapted to store a plurality of outgoing announcements associated with the particular communication sender when attempting to communicate with the particular communication recipient;
a receiver adapted to receive the incoming communication;
an identifier adapted to identify an identified parameter of the incoming communication;
a comparator adapted to compare the identified parameter of the incoming communication to said stored parameters in said first storage device and to thereby identify the particular communication sender;
a selector adapted to pseudo-randomly select both a first selected outgoing announcement and a second selected outgoing announcement from said plurality of outgoing announcements; and
an output device adapted to sequentially output said first and second selected outgoing announcements during a single attempt by said particular communication sender to reach said particular communication recipient to identify the particular communication sender.

11. A system for announcing a particular communication sender of an incoming communication to a particular communication recipient, the system comprising the following:
a first storage device adapted to store parameters indicative of the particular communication sender;
a second storage device adapted to store a plurality of outgoing announcements associated with the particular communication sender when attempting to communicate with the particular communication recipient;
a receiver adapted to receive the incoming communication;
an identifier adapted to identify an identified parameter of the incoming communication;

a comparator adapted to compare the identified parameter of the incoming communication to said stored parameters in said first storage device and to thereby identify the particular communication sender;

a selector adapted to randomly select both a first selected outgoing announcement and a second selected outgoing announcement from said plurality of outgoing announcements; and an output device adapted to sequentially output said first and second selected outgoing announcements during a single attempt by said particular communication sender to reach said particular communication recipient to identify the particular communication sender.

12. A system for announcing a particular communication sender of an incoming communication to a particular communication recipient, the system comprising the following:

a first storage device adapted to store parameters indicative of the particular communication sender;

a second storage device adapted to store a plurality of outgoing announcements associated with the particular communication sender when attempting to communicate with the particular communication recipient;

a receiver adapted to receive the incoming communication;

an identifier adapted to identify an identified parameter of the incoming communication;

a comparator adapted to compare the identified parameter of the incoming communication to said stored parameters in said first storage device and to thereby identify the particular communication sender;

a selector adapted to select both a first selected outgoing announcement and a second selected outgoing announcement from said plurality of outgoing announcements, wherein said selector is adapted to select said first and second selected outgoing announcements seriatim from said plurality of outgoing announcements; and an output device adapted to sequentially output said first and second selected outgoing announcements during a single attempt by said particular communication sender to reach said particular communication recipient to identify the particular communication sender.

13. A method of identifying a telephone caller to a call-receiving party, the method comprising the following steps:

identifying a telephone number of an incoming telephone call;

searching a memory location for at least three aural announcements associated with said identified telephone number and associated with the call-receiving party;

pseudo-randomly selecting a first aural announcement from said at least three aural announcements;

retrieving said first aural announcement from said memory location;

playing said first aural announcement on a speaker for the call-receiving party in lieu of said incoming telephone call generating a first ring tone;

pseudo-randomly selecting a second aural announcement from said at least three aural announcements;

retrieving, said second aural announcement from said memory location; and playing said second aural announcement on said speaker for the call-receiving party in lieu of said incoming telephone call generating a second ring tone.

14. The method of any one of claims 2, 3, 5, 9, and 13, wherein each announcement of said plurality of announcements is recorded in the incoming caller'own voice.

15. The system of any one of claims 4 and 10-12, wherein said parameters indicative of the particular communication sender are selected from the group consisting of a name of the particular communication sender, a telephone number of the particular communication sender, and an email address of the particular communication sender.

16. The system of any one of claims 4 and 10-12, wherein said first storage device is the same as said second storage device.

* * * * *